UNITED STATES PATENT OFFICE 2,422,497

DENTAL IMPRESSION COMPOSITION

Stanley E. Noyes, Los Angeles, Calif.

No Drawing. Application December 22, 1945,
Serial No. 637,089

14 Claims. (Cl. 18—47)

This invention relates to a composition of matter and the method of producing the same. More specifically the invention relates to a dental impression material and the process of producing this material. This application is a continuation-in-part of my applications, Serial Number 463,992, filed October 30, 1942, and Serial Number 527,015, filed March 17, 1944.

For many dental purposes such as making of full dentures, partial dentures, bridges, etc., it is necessary for the dentist to be able to accurately reproduce portions of the mouth of the subject. Such reproductions often involve the duplication of undercuts of more or less severity, as for instance in the case where a tooth or teeth have been extracted and the adjacent teeth have crowded together.

For many years dental impressions have been taken with materials such as plaster of Paris, or various shellac or wax compositions. These materials have little or no elasticity and while it is not difficult to take some impressions with them, such as for most full dentures, it is not possible to reproduce accurately undercuts without either breaking the impression and re-assembling it as is done with plaster, or taking the impression in sections as is the practice in the use of shellac and wax compounds. The foregoing methods obviously involve time and there is the danger of inaccuracy, as well as discomfort to the patient.

By the use of an impression material which may be introduced in the mouth in a fluid or plastic condition and cooled to an elastic state, it is possible to take an impression which will accurately reproduce all details of the portion of the mouth under examination, and which due to its elasticity, can be removed from any undercuts present without losing the accuracy of the impression.

Due to the narrow range of temperature which the human mouth can stand, rather strict limitations are placed on the types of elastic materials which can be used. These materials must obviously be either fluid or plastic when they are heated to place in the mouth and must change by cooling to an elastic gel which will permit removal from the undercuts without permanent distortion. They must also either harden to a solid or be a sufficiently tough and rigid gel so that they may be used as molds for models of plaster or other compounds to be poured into them.

My dental impression material is composed of a suitable gel forming agent which may be obtained, for example, from the various marine algae including gigartina, chondrus, bladder wrack, kelp, gracilaria, or agar-agar. If the gel forming agent is alginic acid it may be converted into the form of a salt, as for example, sodium alginate, potassium alginate, ammonium alginate or mixtures thereof. The salts of alginic acid are used in the impression material to render the product elastic.

In the case where I employ sodium or potassium or ammonium alginate in my final composition I first prepare the alkinate salt of sodium, potassium or ammonium. To this alginate salt I then add a filler such as diatomaceous earth. In the place of diatomaceous earth I may also use talc or clay. To the foregoing I then add lead silicate or other metal silicates such as calcium or manganese silicate. I then add to the foregoing calcium sulphate in the form of the calcium salt containing one-half molecule of water of crystallization or hydration and having the formula $CaSO_4 \cdot \frac{1}{2}H_2O$. This material is available on the market under the name of "Hydrocal." I have found calcium sulphate containing the one-half molecule of water of hydration especially valuable in my final composition. For example, if anhydrous calcium sulphate or calcium sulphate containing two molecules of water of hydration or calcium sulphate in a fully hydrated form is used in place of the calcium sulphate having the one-half molecule of water of hydration per molecule in the final dental impression material the dental impression produced therefrom will begin to change dimensionally within an hour. Since it is highly desirable to obtain an impression which will not change dimensionally upon standing I have found the use of calcium sulphate containing one-half molecule of water of hydration to give a distinct component in this respect over the other forms of calcium sulphate in the final impression composition. Furthermore, I find that the use of $CaSO_4 \cdot \frac{1}{2}H_2O$ (Hydrocal) in the final impression composition produces an impression material which upon storage is less susceptible towards moisture absorption. Hence the ingredients in the final composition have less tendency to react with each other because of the absence of moisture. This results in a product which can be stored for long periods of time by the dentist and still retain its initial reactivity in the final impression.

To the above I also add a fluosilicate in the form of the sodium or potassium salt. Other fluosilicates may also be used. For example, I may use any of the alkaline earth fluosilicates such as barium, calcium, strontium or magnesium.

Fluosilicates of aluminum, zinc or manganese may also be employed.

The fluosilicate in the final impression material lends physical strength to the impression. Its main function, however, is to retard or control the reaction between the calcium ion and the alginate salt. In other words, if the fluosilicate is omitted from the final mixture the ingredients in the impression composition interreact too rapidly and the final impression produced is inferior in quality. A slow even reaction results however when the fluosilicate is present in the composition. Another modification at this point in the compounding of the final dental impression material is to first react the calcium sulphate with the fluosilicate in the presence of water. After this reaction is complete and a stone-like product is obtained, the latter is ground up in the form of a fine powder and then employed in the impression material to replace the fluosilicates and the calcium sulphate. For this modification other salts of calcium may be used, for example, the chloride or nitrate, however, they have the disadvantage of being hygroscopic and the final mixture is rendered less stable by their presence. To the foregoing I also add a small amount of sodium phosphate. Sodium phosphate in the form of sodium pyrophosphate or sodium hexametaphosphate may be used.

The following is a specific example of the method which I employ to produce my final impression material: 110 grams of diatomaceous earth are mixed with 80 grams of lead silicate, 15 grams of sodium silico fluoride (sometimes referred to as sodium fluosilicate), 20 grams of calcium sulphate containing one-half molecule of water of hydration ($CaSO_4.\frac{1}{2}H_2O$), 44 grams of potassium alginate and 5 grams of sodium phosphate.

The foregoing mixture is then placed in a tumbling barrel and thoroughly mixed under such conditions that I avoid any substantial rise in temperature of the material being mixed. In fact, I find it extremely important that during the mixing operation the temperature does not rise substantially above room temperature, i. e., temperatures within the range of 65° F. to 110° F. The tumbling barrel means of mixing has been extremely satisfactory for this operation. This device is made by mounting a shaft through the centers of the barrel ends and placing radial baffles on the inside of the barrel wall which are directed toward the shaft. The material to be mixed is placed in this barrel through a suitable opening in the end or side of the barrel. The tumbler is then rotated for a sufficient period to insure adequate mixing. During the tumbling operation I may use positive means for cooling the constituents contained in the barrel in order to prevent an undue rise in temperature which would result in a product which would soon lose its plastic properties and be worthless as an impression material. The completely mixed or blended product is then withdrawn from the tumbler and packaged.

Twenty-one grams of the blended material withdrawn from the tumbler when thoroughly mixed with 50 grams of water results in the production of a creamy mixture which sets in a short time to an elastic gel. In practice this creamy mixture is placed in a dental tray which is placed in the mouth of the patient where it sets up in the form of the elastic gel in from three to six minutes. The setting time can be varied by varying the temperature of the water used. Cold water will retard the set and warm water will hasten it. This control can also be maintained by varying the amount of the powdered composition used in combination with water. The greater amount of powder used in relationship to the water the more time will be required to obtain the proper set.

An impression containing the above composition can be removed from the mouth after setting without breaking, tearing or distorting and will allow dental stone or plaster of Paris to set hard against its surface with extreme accuracy. This impression material also possesses the quality of not requiring a separating medium or fixing bath before pouring dental stone or plaster of Paris into the impression. Furthermore, it can be stored over a long period without deteriorating.

While this material has been found to be highly satisfactory for use as a dental impression material, it may also be used for many other purposes where it is desired to make an impression of an object.

As previously described I may first react the calcium salt with the fluosilicate in the presence of water to produce a hard and stone-like reaction product which can be ground up and used in my final compounded material. The following is a complete explanation of the method of obtaining this modified composition.

Equal parts of calcium sulphate ($CaSO_4.\frac{1}{2}H_2O$) and sodium or aluminum fluosilicate are blended together and then mixed with sufficient water to form a thick paste. This mixture will set within a few minutes more or less, depending upon the type of fluosilicate used, to a hard mass resembling stone. Some heat is generated during this setting reaction and the mass is allowed to cool before being broken and ground to a fine powder. This powder may be used by itself as a precipitating agent for alginate in a dental impression material or may be used in conjunction with aluminum fluosilicate.

When used by itself a typical formulation is as follows:

|  | Grams |
|---|---|
| Diatomaceous earth | 110 |
| Lead silicate | 300 |
| Reacted salt, as described above | 10 |
| Alginate (potassium, sodium or ammonium) | 40 |
| Sodium phosphate | 4.75 |

These ingredients are thoroughly blended by tumbling and thirty-five grams of this mixed with 50 cc. water, results in a creamy mass which sets to an elastic gel within two minutes more or less, depending upon the temperature of the water used.

When used in conjunction with aluminum fluosilicate only a small amount can be employed as the reaction between aluminum fluosilicate and lead silicate precipitates alginate. A typical formulation of this is as follows:

|  | Grams |
|---|---|
| Diatomaceous earth | 110 |
| Lead silicate | 300 |
| Aluminum fluosilicate | 20 |
| Alginate (potassium, sodium or ammonium) | 40 |
| Reacted salt as described | 3 |
| Sodium phosphate | 3.5 |

These ingredients are blended together by tumbling. 35 grams are used to mix with 50 cc.

water forming a creamy mass which sets to an elastic gel in two minutes more or less, depending upon the temperature of water used.

Calcium chloride and calcium nitrate may also be used as substitutes or calcium sulphate in this modified composition to produce the reaction product with the sodium or aluminum fluosilicate. Furthermore, the salts of barium, strontium, and magnesium in the form of chlorides, nitrates and sulphates may be reacted with sodium or aluminum fluosilicate in the presence of water and the reaction product obtained powdered and used as a substitute for the reaction product of the calcium sulphate and sodium or aluminum fluosilicate in the impression compound described above.

I claim:

1. A composition of matter comprising a water soluble metal salt of alginic acid and calcium sulphate containing one-half molecule of water of hydration ($CaSO_4 \cdot \frac{1}{2}H_2O$).

2. A composition of matter comprising a water soluble metal salt of alginic acid, a fluosilicate and calcium sulphate.

3. A composition as claimed in claim 2 in which the alginic acid salt is an alkali metal salt and the fluosilicate is sodium fluosilicate.

4. A composition of matter comprising a water soluble metal salt of alginic acid, a fluosilicate, calcium sulphate and a water soluble phosphate salt.

5. A composition of matter comprising a water soluble metal alginate, calcium sulphate, a fluosilicate and lead silicate.

6. A composition as claimed in claim 5 which also contains a water soluble phosphate salt.

7. A composition of matter comprising a water soluble alginate, a fluosilicate, a water soluble phosphate, a filler, lead silicate and calcium sulphate.

8. A composition of matter comprising an alkali metal alginate, sodium fluosilicate, sodium phosphate, diatomaceous earth, lead silicate and calcium sulphate.

9. A composition as claimed in claim 2 in which the calcium sulphate contains one-half mole of water of hydration ($CaSO_4 \cdot \frac{1}{2}H_2O$).

10. A composition of matter comprising a water soluble alginate salt and the product obtained by reacting an alkaline earth metal salt with a fluosilicate.

11. A composition of matter as claimed in claim 10 in which the fluosilicate is an alkali metal fluosilicate.

12. A composition of matter as claimed in claim 10 which contains lead silicate, sodium phosphate and a filler such as diatomaceous earth.

13. A composition of matter as claimed in claim 1 which also contains a filler.

14. A composition of matter as claimed in claim 2 which also contains a filler.

STANLEY E. NOYES.

REFERENCES CITED

The following references are of record in the file of this patent:

UNITED STATES PATENTS

| Number | Name | Date |
| --- | --- | --- |
| 2,315,465 | Vallandigham | Mar. 30, 1943 |